(12) United States Patent
Hong et al.

(10) Patent No.: US 10,055,509 B2
(45) Date of Patent: Aug. 21, 2018

(54) CONSTRUCTING AN IN-MEMORY REPRESENTATION OF A GRAPH

(71) Applicant: Oracle International Corporation, Redwood Shores, CA (US)

(72) Inventors: Sungpack Hong, Palo Alto, CA (US); Zhe Wu, Mountain View, CA (US); Korbinian Schmid, Munich (DE); Felix Kaser, San Francisco, CA (US); Martin Sevenich, Palo Alto, CA (US); Hassan Chafi, San Mateo, CA (US); Jayanta Banerjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 436 days.

(21) Appl. No.: 14/680,150

(22) Filed: Apr. 7, 2015

(65) Prior Publication Data

US 2016/0299991 A1 Oct. 13, 2016

(51) Int. Cl.
*G06F 17/30* (2006.01)
*G06F 17/00* (2006.01)

(52) U.S. Cl.
CPC .. *G06F 17/30958* (2013.01); *G06F 17/30327* (2013.01); *G06F 2201/80* (2013.01)

(58) Field of Classification Search
CPC ......... G06F 17/30958; G06F 17/30539; G06F 13/4208; G06F 17/30516; G06F 17/30601; G06F 17/30876; G06F 17/30893; G06F 3/0683; G06F 3/0685; G06F 3/0613; G06F 3/0647; G06F 3/0604; G06F 3/0631; G06F 12/0646; G06F 3/0632; G06F 3/0644
See application file for complete search history.

(56) References Cited

U.S. PATENT DOCUMENTS

| | | | | |
|---|---|---|---|---|
| 2001/0042062 | A1* | 11/2001 | Tenev | G06F 17/30958 |
| 2008/0243908 | A1* | 10/2008 | Aasman | G06F 17/30241 |
| 2011/0320411 | A1* | 12/2011 | Henderson | G06F 17/30575 707/687 |

(Continued)

OTHER PUBLICATIONS

Titan, "Distributed Graph Database", http://thinkaurelius.github.io/titan/, last viewed on May 6, 2015, 2 pages.

(Continued)

*Primary Examiner* — Yicun Wu
(74) *Attorney, Agent, or Firm* — Hickman Palermo Becker Bingham LLP; Daniel D. Ledesma

(57) ABSTRACT

Techniques for efficiently loading graph data into memory are provided. A plurality of node ID lists are retrieved from storage. Each node ID list is ordered based on one or more order criteria, such as node ID, and is read into memory. A new list of node IDs is created in memory and is initially empty. From among the plurality of node ID lists, a particular node ID is selected based on the one or more order criteria, removed from the node ID list where the particular node ID originates, and added to the new list. This process of selecting, removing, and adding continues until no more than one node ID list exists, other than the new list. In this way, the retrieval of the plurality of node ID lists from storage may be performed in parallel while the selecting and adding are performed sequentially.

25 Claims, 17 Drawing Sheets

(56) References Cited

U.S. PATENT DOCUMENTS

| | | | | |
|---|---|---|---|---|
| 2012/0096043 | A1* | 4/2012 | Stevens, Jr. | G06F 17/30958 707/798 |
| 2015/0186427 | A1* | 7/2015 | Logothetis | G06F 17/30958 707/776 |
| 2016/0117414 | A1* | 4/2016 | Verma | G06F 17/30958 707/798 |
| 2016/0292303 | A1* | 10/2016 | Hong | G06F 17/30563 |

OTHER PUBLICATIONS

Pey, Larriba, "News and Events—Performance in Action", Management of Mobile Device Data, Sparsity-Technologies, http://sparsity-technologies.com/blog/, last viewed on May 6, 2015, 11 pages.

Neo4j Graph Database, "What is a Graph Database?", http://neo4j.com/developer/graph-database/, last viewed on May 6, 2015, 7 pages.

IBM Knowledge Center, "RDF Application Development for IBM Data Servers" http://www-01.ibm.com/support/knowledgecenter/SSEPGG_10.1.0/com.ibm.swg.im.dbclie, last viewed on May 6, 2015, 1 page.

Giraph "Introduction to Apache Giraph", http://giraph.apache.org/intro.html, last viewed on May 6, 2015, 2 pages.

Dato.com, "GraphLab Create User Guide", Introduction, 1 page, last viewed on May 6, 2015, 1 page.

\* cited by examiner

CONSTRUCTING AN IN-MEMORY REPRESENTATION OF A GRAPH

CROSS-REFERENCE TO RELATED APPLICATIONS; BENEFIT CLAIM

This application is related to U.S. application Ser. No. 14/332,182, filed Jul. 15, 2014, the entire contents of which is hereby incorporated by reference as if fully set forth herein.

TECHNICAL FIELD

The present disclosure relates to a graph database system that efficiently loads graph data representing a graph and constructs efficient in-memory representation of the graph.

BACKGROUND

Graph analysis is an important type of data analytics where the underlying data-set is modeled as a graph. Since such a graph representation captures relationships between data entities, applying graph analysis procedures can provide valuable insight about the original data-set to the user. Examples of popular graph analysis procedures are Community Detection, PageRank, Shortest Path Finding, and Link Prediction.

Two different types of systems have emerged for graph processing. One type is a graph database that manages graph data in persistent storage. The other type is graph analytic framework that enables fast computation on graph data. A graph analytic framework adopts in-memory computation, because out-of-core computation on graph data is significantly slower than in-memory computation.

Therefore, in the second type of system, graph data "migration" becomes an important step in graph data processing. Graph data migration refers to the process of moving graph data from the database into a graph analytic framework for data analysis. In the case of large graph data sets, graph data migration may take a significant amount of time.

One approach for graph data migration is graph data being exported from a database to a file system and then being imported from the file system into a graph analytic framework. However, such a file-based graph data migration takes a significant amount of time and is not user friendly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
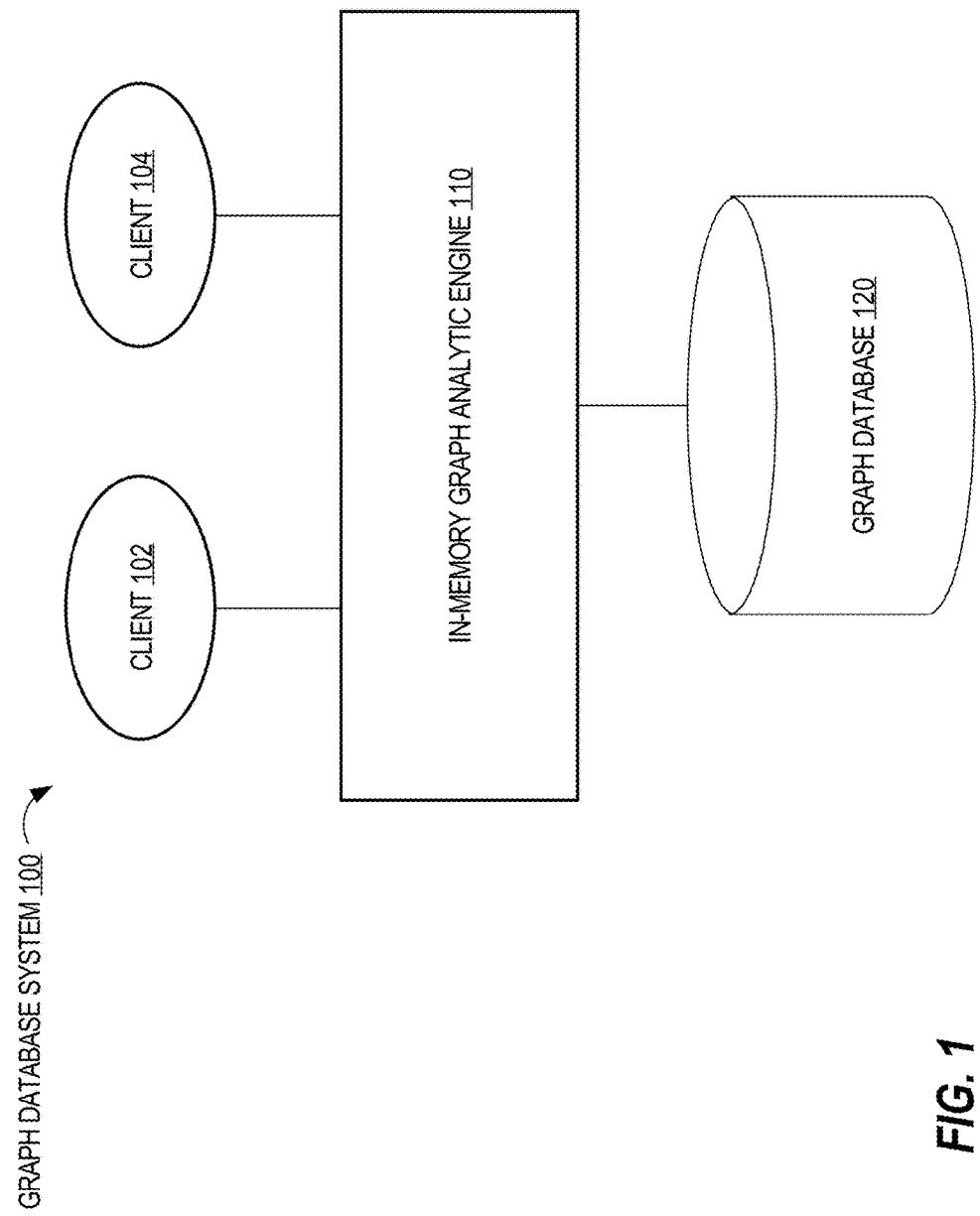
FIG. 1 is a block diagram that depicts an example graph database system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for efficiently creating an in-memory representation of a graph are provided. Creating an in-memory representation of a graph involves multiple phases, some of which may be performed in parallel, and may include a node loading phase, a node merging phase, a node property construction phase, an edge loading phase, an edge merging phase, and an edge property construction phase. During the node loading phase, a plurality of node ID lists are retrieved from persistent storage. Each node ID list is ordered based on one or more order criteria, such as node ID, and is read into (e.g., volatile) memory. During the node merging phase, a particular node ID is selected from among the plurality of node ID lists based on the one or more order criteria. The particular node ID is removed from its node ID list and added to a mapping that maps node IDs to node index values that indicate a location within a node array of an in-memory representation of a graph. The mapping is used to help construct a neighbor array that stores, for each entry in the neighbor array, destination node information regarding a different edge in the graph.

In an embodiment, an intermediate table is constructed that stores, for each node ID that has been mapped to a node index value, (1) node ID list identification data that identifies the node ID list from which the corresponding node (identified by the node ID) originates and (2) local index data that identifies a location within that node ID list. Using the node ID identification and the local index data in the intermediate table (which is ordered by node ID), a node property data structure may be populated in parallel. A similar intermediate table may be constructed for edge information so that an edge property data structure may be populated in parallel.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Graph Database System Overview

FIG. 1 is a block diagram that depicts an example graph database system 100, in an embodiment. Graph database system 100 includes a graph database 120 that stores graph data, an in-memory graph analytic engine 110, and clients 102 and 104 that send requests to and receive responses from graph analytic engine 110. While only two clients 102-104 are depicted, graph database system 100 may support many more clients. Also, while FIG. 1 depicts client 102-104 as directly connected to graph analytic engine 110, clients 102-104 may be, instead, communicatively coupled to graph analytic engine 110 over one or more networks (not shown). Clients 102 and 104 may be in the same or different networks relative to each other.

Graph Data

As noted previously, graph database 120 stores graph data about one or more graphs, each comprising multiple nodes and edges. If graph database 120 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph database 120 may be a relational database or an object database. For example, one node table in graph database 120 may include a row for each node in a graph. (Graph database 120 may store a different node table for each graph represented in the graph data.) Each column in the node table may correspond to a different attribute or property of the node, such as a name, an age, and a date, depending on the type of object the nodes represent. A node table may include multiple rows for a single node. For example, a node table may have two columns: a node ID column and a node property column that is not specific to any particular property type. If a single node has multiple properties, then multiple rows are used to reflect those properties.

Graph database 120 may also store an edge table that corresponds to the node table. Each row in the edge table corresponds to a different edge in the graph. The edge table may have at least two columns: one column corresponding to the "from" or source node and another column corresponding to the "to" or destination node. These two columns may be foreign keys to the node table. The edge table may also have additional columns, each additional column corresponding to an attribute or characteristic about the corresponding edge. Alternatively, an edge table may represent an edge with multiple rows, where each row reflects a different property of the edge.

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

When a graph is stored in memory from graph database 120, the names or identifiers of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, the data and, optionally, the format of a graph that is stored in graph database 120 may be different than the data and format of the corresponding graph in memory. Furthermore, the values of node identifiers in memory may be later mapped back to their respective original values that identify real-world objects, such as email addresses, IP addresses, MAC addresses, or social network account identifiers.

In-Memory Graph Analytic Engine

In-memory graph analytic engine 110 performs one or more graph analytic operations on a "graph instance" that is loaded from graph database 120 and stored in-memory of one or more computing devices (or nodes). A graph instance is an in-memory version of a graph whose nodes and edges are stored in graph database 120. A graph instance is considered a snapshot of a graph at a particular point in time. Thus, a graph instance is associated with a transaction identifier, a timestamp, or an internal system clock number, such as a system change number (SCN). If another graph instance is generated based on another version of the same graph that includes one or more subsequent changes (e.g., an insertion or deletion of a node), then that graph instance is associated with a different transaction ID, timestamp, or SCN. While embodiments are not limited to any type of value that is used to indicate a particular point in time, the following examples are in the context of a transaction ID.

In-memory graph analytic engine 110 may be implemented in hardware, software, or any combination of hardware and software. For example, in-memory graph analytic engine 110 may execute on one or more nodes, each comprising one or more processors and memory (such as random access memory (RAM)) that stores instructions that are executed by the one or more processors. Even though FIG. 1 depicts a single element for in-memory graph analytic engine 110, in-memory graph analytic engine 110 may be implemented on a single computing device or on multiple computing devices connected via a communication network.

In-memory graph analytic engine 110 functions as a server for clients 102 and 104. Each client connects to in-memory graph analytic engine 110 and requests certain types of tasks, such as loading a graph into memory and performing graph analytic operations, including returning information about a graph, adding nodes and edges to a graph, deleting nodes and edges from a graph, and updating properties or attributes of nodes/edges of a graph. Thus, in-memory graph analytic engine 110 translates client requests into graph operations that a storage device that stores graph database 120 recognizes or is configured to process.

Client requests (e.g., from clients 102 and 104) may conform to a standard or proprietary set of APIs, such as BluePrint API.

Each graph stored in graph database 120 may be associated with a graph identifier that uniquely identifies the graph relative to other graphs that are also stored in graph database 120. Thus, in-memory graph analytic engine 110 may translate a graph name (that is specified or otherwise indicated in a client request) to a graph identifier.

In response to receiving a client request, in-memory graph analytic engine 110 sends a retrieval request to graph database 120 for a particular graph. The retrieval request may indicate (in addition to a graph identifier) that all the nodes and edges of a particular graph are to be retrieved. Alternatively, the retrieval request may indicate one or more filter criteria that are used to filter out nodes and/or edges from the graph that is stored in graph database 120. For example, one filter criterion may be age of a node, such as all nodes that were added to the graph more than two days ago. Thus, any nodes older than two days are not part of the corresponding graph instance (i.e., that is created in-memory). Thus, a graph instance may not reflect all the nodes and edges of the graph at the particular time that is associated with the graph instance.

Filter criteria may be applied by graph database 120 or by in-memory graph analytic engine 110. For example, if a filter criterion is "NODE.age>10", then in-memory graph analytic engine 110 may request graph database 120 for all nodes that have an age attribute value that is greater than 10. As another example, filter criteria for an edge may be "source.color=blue and destination.color=red", in which case in-memory graph analytic engine 110 applies the filter criteria while creating a graph instance by checking the value of the attribute "color" of each end of each edge. Applying such filter criteria may require a join and in-memory graph analytic engine 110 may be much more efficient than graph database 120 at performing joins.

Instead of creating a graph instance in memory in response to a client request, in-memory graph analytic engine 110 may load a graph instance prior to any client request for data regarding the corresponding graph. For example, upon startup, in-memory graph analytic engine 110 may load one or more graph instances, such as those graphs that are most frequently requested by clients.

Example Graph Instance

Figure 2:
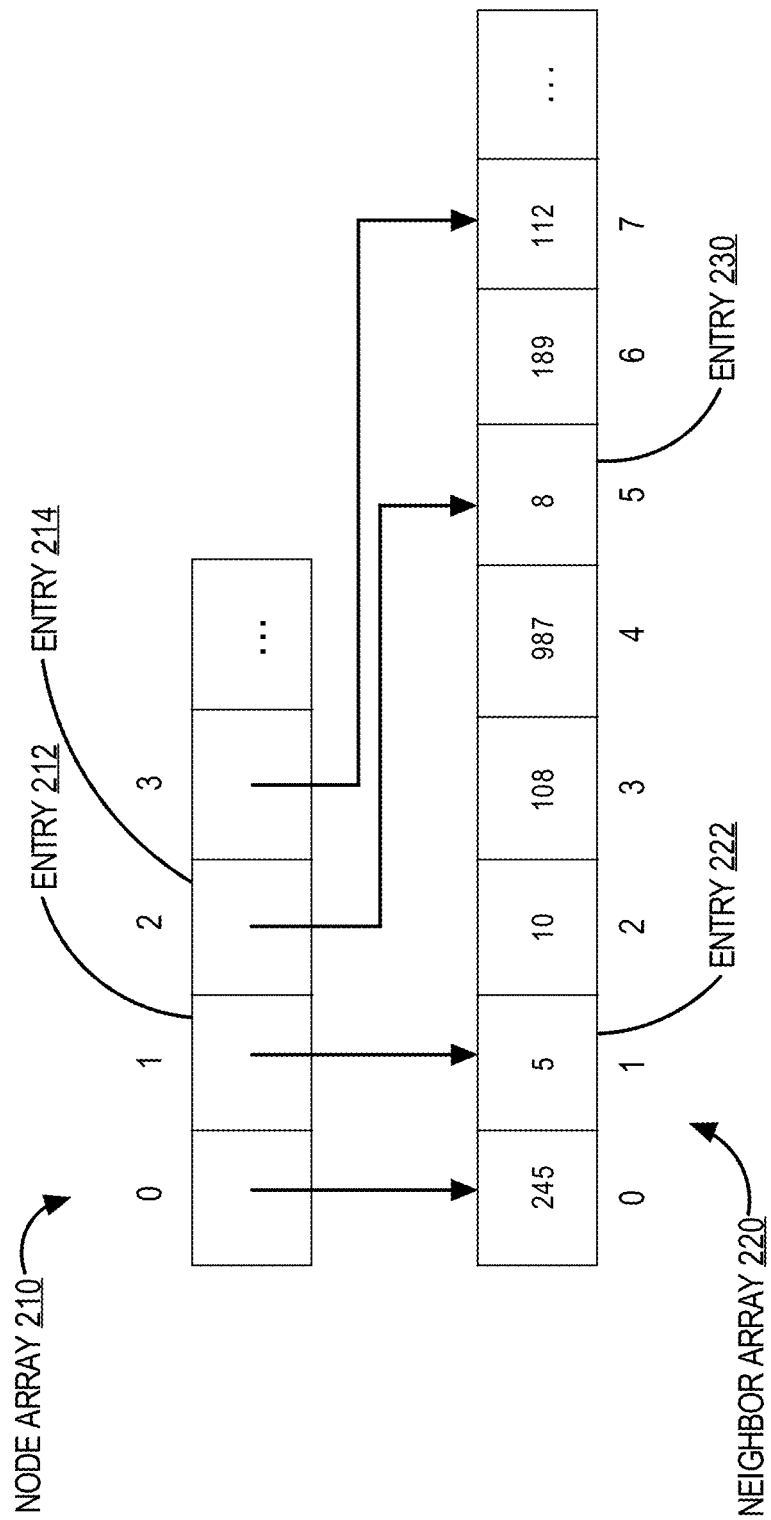
FIG. 2 is a block diagram that depicts an example graph instance, in an embodiment.

A graph may be represented in any number of ways. Embodiments are not limited to any particular representation. FIG. 2 is a block diagram that depicts two arrays of a graph instance: a node array 210 and a neighbor array 220, in an embodiment. Each entry in node array 210 corresponds to a different node in a graph and includes a value (e.g., an index, a reference, or a pointer) that is used to identify an entry in neighbor array 220. For example, if a user of a social networking service has 1029 friends (or registered contacts) and a node in node array 210 corresponds to that user, then neighbor array 220 would include 1029 entries, one for each "friend" of the user.

In an embodiment, each of one or more entries in node array 210 includes one or more data values that indicate information about the corresponding node. For example, an entry in node array 210 includes a data value for one or more properties of the corresponding node. As noted previously, a property of a node may be a name, an age, a date, a time, a salary, or a description of some kind.

The "pointed-to" entry in neighbor array 220 that is "pointed to" by a "pointing" entry in node array 210 indicates that the node represented by the "pointed-to" entry is a "neighbor" of the node represented by the "pointing" entry. For example, entry 212 in node array 210 may include an index value (e.g., '1') that corresponds to entry 222 in neighbor array 220. Thus, with respect to entry 222, entry 222 is a "pointing" entry. Entry 212 is the second position in node array 210. If each node in a graph (that comprises N nodes) is given a unique value from 0 to N−1, then entry 212 corresponds to node '1' which can be used to index into node array 210 at the second position. Entry 222 includes the value '5', indicating that it can be used to index into node array 210 at the sixth position.

The neighbors of a particular node indicated in node array 210 may be determined based on (1) the "pointed-to" entry (in neighbor array 220) that the "pointing" node indicates (or references) and (2) the entry (in neighbor array 220) that the node subsequent to the "pointing" node in node array 210 indicates (or references). For example, entry 212 indicates (or references) entry 222 in neighbor array 220. Entry 214 indicates (or references) entry 230. All entries between entry 222 and entry 230 (including entry 222 and excluding entry 230) are neighbors of entry 212. Thus, the neighbors of the node indicated by entry 212 are nodes 5, 10, 108, and 987.

The set of neighbors that are indicated in neighbor array 220 and that correspond to a particular node in node array 210 is referred to herein as the "neighbor list" of the particular node. Each neighbor list is indicated by a contiguous set of entries in neighbor array 220.

In an embodiment, each neighbor list in neighbor array 220 is sorted by node value. If each neighbor list in neighbor array 220 is not sorted initially, then each neighbor list may be ordered before graph analysis operations are performed on the graph instance, such as identifying common neighbors or counting triangles.

In a related embodiment, an entry in node array 210 includes two values that are used to identify neighbors of the entry. For example, entry 212 may include the values '1' and '4'. The neighbor list of entry 212 may then be determined as the nodes between (and including) the second entry and the fifth entry in neighbor array 220.

Graph Data Storage

In one embodiment, graph database 120 stores graph data of a graph in sorted order. For example, a node table may list each node in a graph (with one or more corresponding properties), where the node table is ordered based on one or more order criteria, such as node ID. The node table may also be indexed. Additionally, the node table may be partitioned into multiple partitions that are separately indexed and/or searchable.

In an alternative embodiment, graph data of a graph is not stored in sorted order. However, one or more indexes may be used to identify the nodes of the graph in a sorted order. For example, if a node table is partitioned, a separate index is built for each node table partition. Later, when graph database 120 receives a request for the graph data, each index is used to retrieve a different list of node IDs.

In a related embodiment, not only is graph data of a graph not stored in sorted order, but no indexes are used to construct one or more sorted lists of node IDs. Instead, graph analytic engine 110 receives (e.g., in parallel) unsorted node ID lists and stores the node ID lists (e.g., in parallel).

Edge information may be stored similarly to node information. For example, edge information may be stored in one or more tables/partitions, where a single row corresponds to a single edge. If an edge has multiple properties, then multiple rows in an edge table/partition may be used to store those edge properties. Also, graph database 120 may store an index for each table/partition so that edges may be retrieved and sent to graph analytic engine 110 in sorted order. Edges of a graph may be sorted first on source node ID and then based on destination node ID. The following six edges are sorted in this manner: {23, 45}, {23, 65}, {23, 93}, {24, 31}, {25, 28}, {25, 31}.

In embodiments where graph data of a graph is stored in multiple partitions, the number of partitions for node information may be different than the number of partitions for edge information. Also, partitioning may be based on simple hash functions on node (or edge) ID.

Additionally, when properties of a node (and/or edges) are stored over multiple rows, all the rows (or edges) are located in the same physical data partition. In a related embodiment, all edges from the same source node (or destination) do not necessarily go into the same data partition. Graph database 120 may avoid storing all the edges from the same node in the same partition because there may exist a few nodes that have a significant number of edges.

Overview of Creating a Node Array

Figure 3:
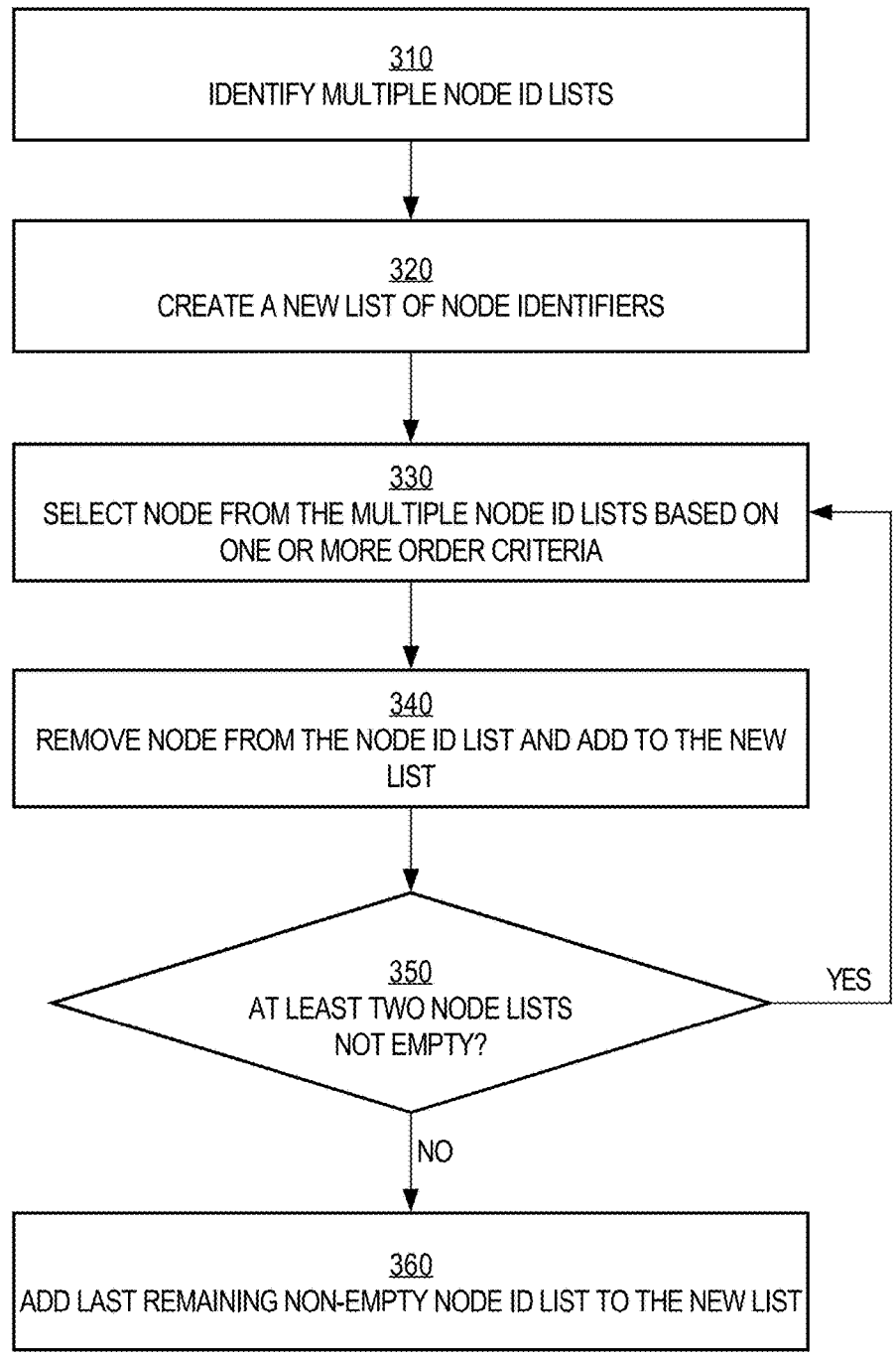
FIG. 3 is a flow diagram that depicts a process for creating at least a portion of an in-memory representation of a graph, in an embodiment.

FIG. 3 is a flow diagram that depicts a process 300 for creating at least a portion of an in-memory representation of a graph, in an embodiment. Process 300 may be implemented by graph analytic engine 110.

At block 310, a plurality of node ID lists are identified. Each node ID list include node IDs of the same graph. Thus, a first node ID list of the plurality identifies nodes of a particular graph and a second node ID list of the plurality identifies nodes of the particular graph. Each node ID list is ordered based on the same one or more criteria. An example criterion is the node ID itself. The node ID lists are either ordered in ascending order or in descending order.

At block 320, a new list of node IDs is created. The new list is empty. The new list may correspond to node array 210, described previously. Although block 320 is described as being performed after block 310, block 320 may be performed prior to block 310.

At block 330, a node ID is selected from the available node ID lists based on one or more order criteria, such as the same one or more criteria that are used to order each node list in the plurality. For example, if there are three node ID lists and the "top" or "first" node IDs in the three node ID lists are, respectively, '98,' '23,' and '46,' then the node ID of '23' is selected.

At block 340, the selected node ID is removed from the corresponding node ID list and added to the new list.

At block 350, it is determined whether at least two of the plurality of node ID lists are not empty. If so, then process 300 returns to block 330. Else, process 300 proceeds to block 360.

At block 360, the last remaining non-empty node ID list is added to the new list. If the new list and the last remaining non-empty node ID list are ordered based on the same one or more order criteria, then the node ID list may be simply "tacked on" to the end of the new list.

Example Data Model of a Graph

Figure 4:
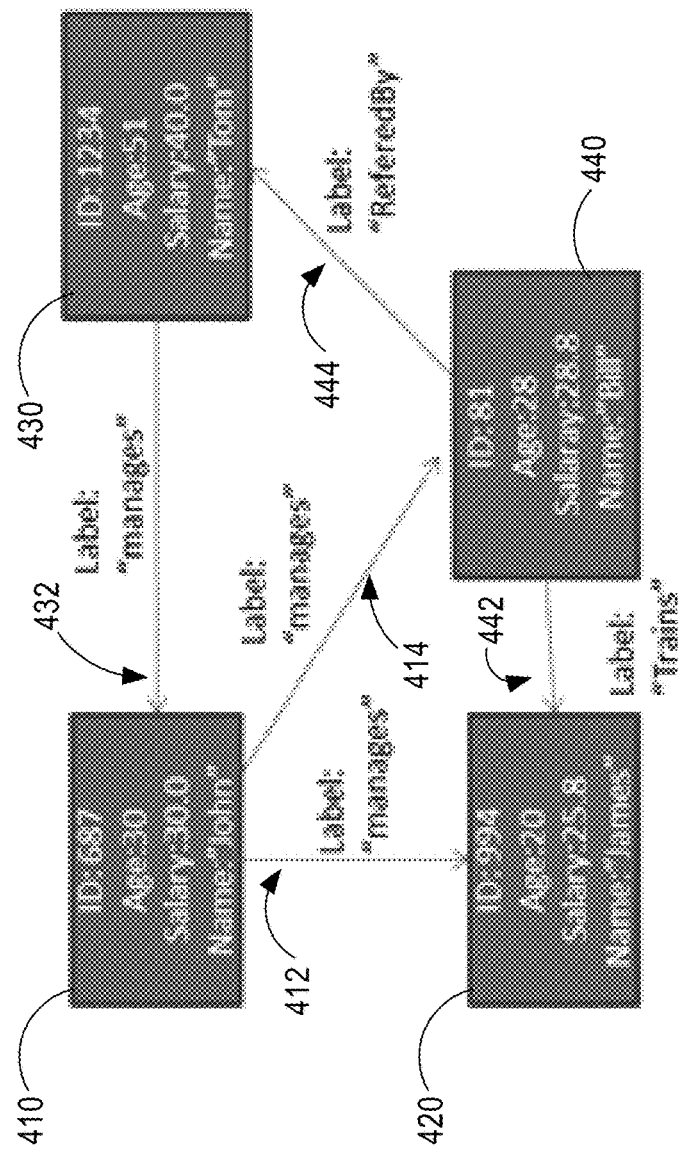
FIG. 4 is a block diagram that depicts an example data model of a particular graph, in an embodiment.

FIG. 4 is a block diagram that depicts an example data model 400, in an embodiment. Data model 400 includes nodes 410-440. Each of nodes 410-440 contains four properties. In other embodiments, different nodes of the same graph may have a different number of properties. Data model 400 also includes directed edges 412, 414, 432, 442, and 444. In other embodiments, a graph contains one or more undirected edges. Each of the edges includes a label property. The values of the label property vary from edge to edge and include, in the depicted example, "trains," "manages," and "referred by." In other embodiments, different edges of the same graph may have a different number of properties.

Graph Data Loading Overview

In an embodiment, loading graph data into memory comprises multiple phases: a node loading phase, a node merging phase, a node property construction phase, an edge loading phase, an edge merging phase, and an edge property construction phase. While these phases are described in a particular order, some phases may be performed before other phases or concurrently with other phases. For example, one or more of the edge related phases may be performed prior to the node property construction phase. As another example, the edge merging phase may be performed while the node merging phase is being performed.

Graph Data Loading: Node Loading Phase

In the node loading phase, graph analytic engine 110 loads multiple node lists in parallel from graph database 120. Graph analytic engine 110 uses K threads and K connections to graph database 120, each thread being assigned to a different connection, and different set of node information being retrieved over a different connection. Node information may include not only node IDs, but also node properties that are stored in association with the node IDs.

If node information is stored in multiple partitions, then each partition is sent over to graph analytic engine 110 using one of the K connections. If there are more partitions P than connections K, then multiple partitions may be sent over the same connection. If there are more connections K than partitions P, then an entire partition is sent over a single connection or a partition may be broken up into multiple portions and each portion sent over a different connection.

Figure 5:
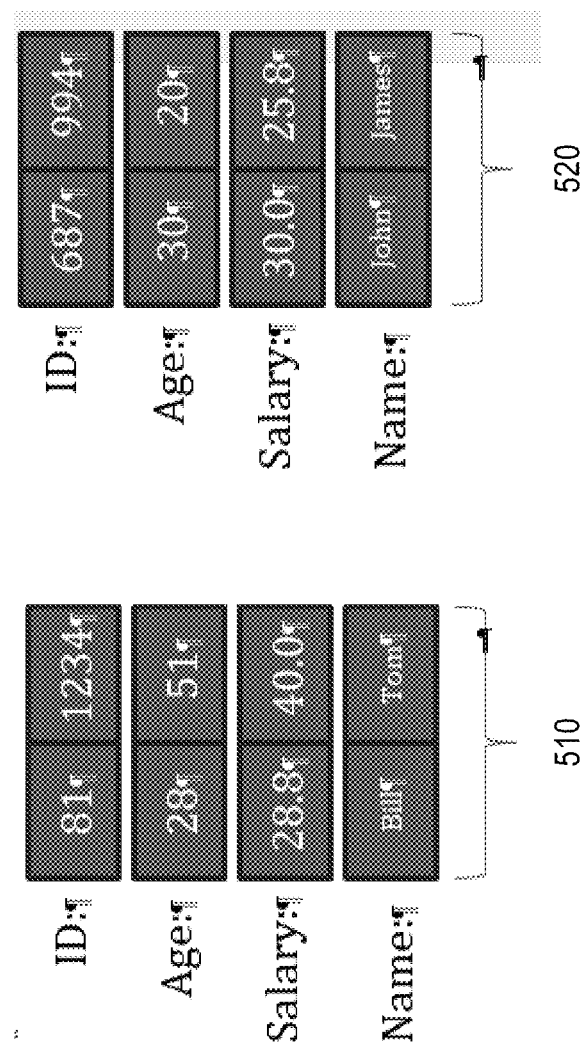
FIG. 5 is a block diagram that depicts graph data from two partitions in a graph database after a node loading phase, in an embodiment.

FIG. 5 is a block diagram that depicts graph data from two partitions in graph database 120: node ID list 510 and node ID list 520. Each node ID list includes node data (specifically, four property values for four properties) for two different nodes. Each of node ID lists 510 and 520 is ordered based on node ID.

Because multiple threads may be involved in retrieving node ID lists from graph database 120 over multiple connections, the node loading phase may be performed in parallel.

Graph Data Loading: Node Merging Phase

In the node merging phase, the node loading results (e.g., node ID lists 510-520) are merged into an intermediate table. Each node in a graph is assigned a new index or key value that indicates a position in the intermediate table. For example, a node index of '0' indicates that the corresponding node is located at the first position in the intermediate table. A node index of '10' indicates that the corresponding node is located at the 11$^{th}$ position in the new intermediate table. In an embodiment, the original node IDs (as they existed in graph database 120) are still preserved.

Figure 6:
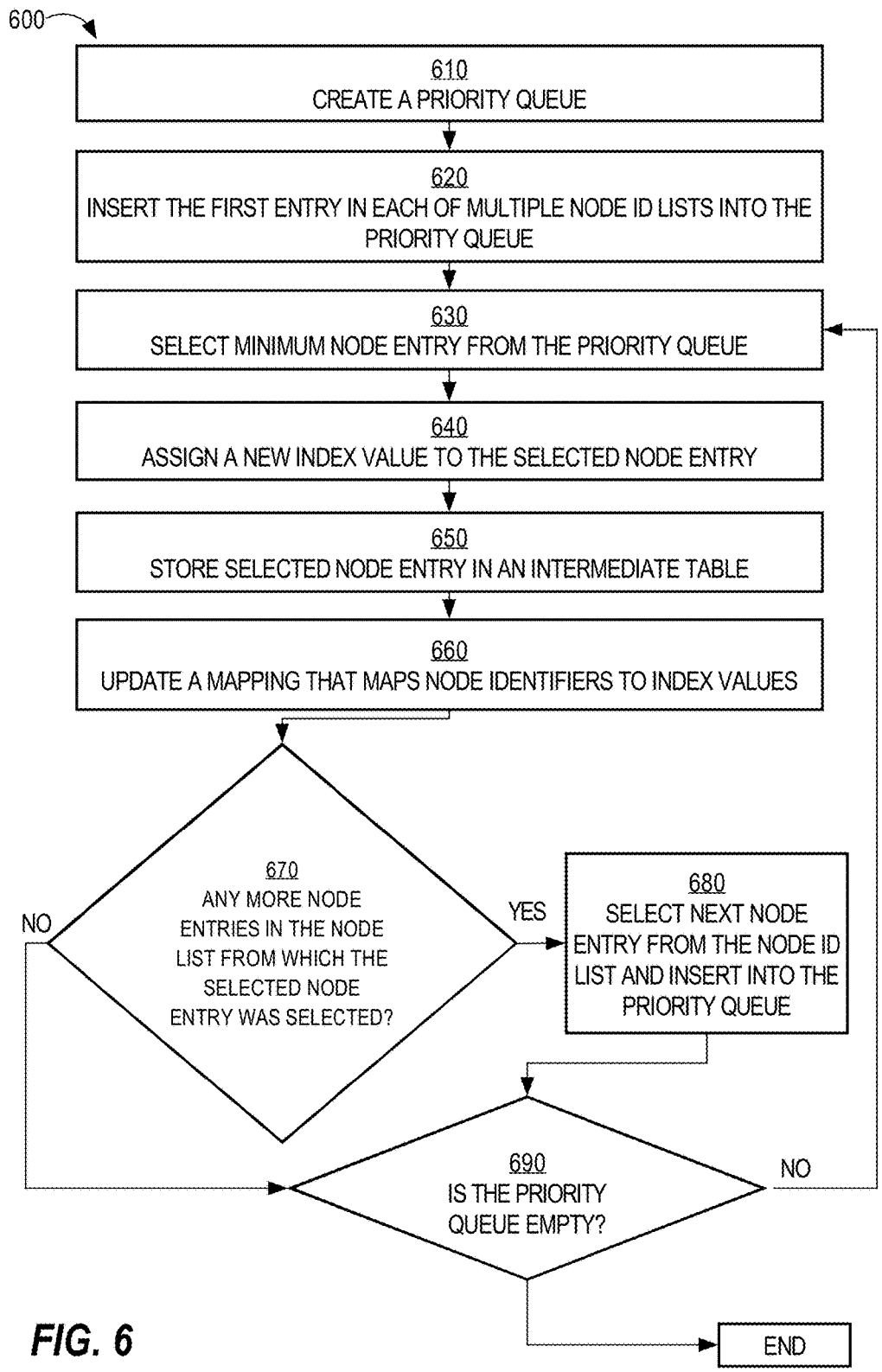
FIG. 6 is a flow diagram that depicts a process for merging node ID lists in a node merging phase, in an embodiment.

FIG. 6 is a flow diagram that depicts a process 600 for merging node ID lists, in an embodiment. Process 600 is described in context with FIGS. 7A-7G, which depict different intermediate results of process 600 relative to node ID lists 510 and 520 in FIG. 5.

At block 610, a priority queue is created.

At block 620, a node entry for the first node in each list of multiple node ID lists is inserted into the priority queue. If there are three node ID lists, then three node entries are inserted into the priority queue.

A single node entry may include one or more data items. For example, a node entry may have the form of <node ID, partition ID, and local index>, where "node ID" is an identifier (or key) that is unique relative to all other nodes in a graph, "partition ID" is an identifier that uniquely identifies a list of node IDs and/or a partition from which node information of the corresponding node was read, and "local index" is a position of the corresponding node in the list/partition.

Figure 7A:
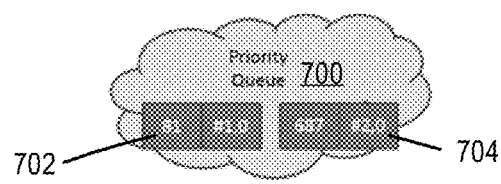
FIGS. 7A-7G depict different example intermediate results of a node merging phase.

FIG. 7A depicts an intermediate result where priority queue 700 includes two node entries: node entry 702 and node entry 704. Node entry 702 has a node ID of '81,' a partition ID of '#1' and a local index of '0'. Node entry 704 has a node ID of '687,' a partition ID of '2' and a local index of '0'. In this example, there are only two partitions or node ID lists.

At block 630, a minimum node entry in the priority queue is selected. A minimum node entry is one that has the lowest node ID among the node entries in the priority queue. Alternatively, a maximum node entry in the priority queue is selected. This presumes that the node ID lists (e.g., from the various partitions) are ordered by node ID in descending order. However, in each of the examples provided herein, the node ID lists are ordered by node ID in ascending order.

Figure 7B:
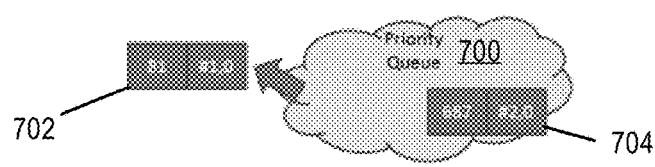

FIG. 7B depicts an intermediate result where node entry 702 is selected as the minimum node entry.

At block 640, the selected node entry is assigned a new index value. If this is the first iteration of block 640, then the new index value may be '0'. If this is the second iteration of block 640, then the new index value may be '1', and so forth.

Figure 7C:
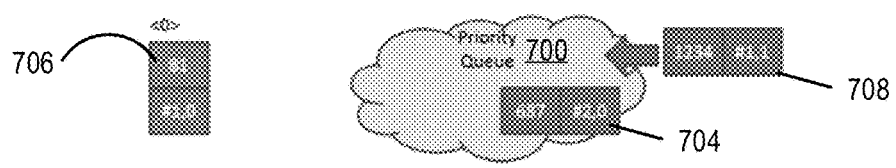

FIG. 7C depicts an intermediate result where node entry 702 is stored in an intermediate table 706, where the first entry in intermediate table 706 is assigned to index value '0.' Embodiments are not limited to how intermediate table 706 is implemented. Intermediate table 706 may be implemented as a list or an array. A table and an array may be considered different types of lists. Thus, each entry in intermediate table 706 may correspond to a column in a table, an entry in an array (such as node array 210), or an entry in a list.

At block 650, the selected node entry is stored in an intermediate table. The new index value assigned to the selected node entry may indicate a position in the new list/table. Initially, before the first iteration of block 650, the new list/table is empty.

At block 660, a mapping (that is initially empty) is updated to map the node ID of the selected node entry to the new index value assigned in block 640.

At block 670, it is determined whether there are any more node entries in the list/partition from which the selected node entry was selected. If so, then process 600 proceeds to block 680. Else, process 600 proceeds to block 690. Block 670 may be performed by maintaining a local index value for each list (or partition) from which node entries are selected for the priority queue. If the node entry that is selected in block 630 originates from a particular list, then a local index value associated with the particular list is incremented. If the incremented local index value is greater than the size of the particular list, then the particular list is empty.

At block 680, the next node entry from the same node ID list as the selected node entry is inserted into the priority queue (and removed from that node ID list). Block 680 may also involve incrementing a local index value for the node ID list indicating that another node entry from that node ID list has been inserted into the priority queue.

Figure 7D:

FIGS. 7C and 7D depict intermediate results where node entry 708 is selected from partition ID '#1' and inserted into priority queue 700.

At block 690, it is determined whether the priority queue is empty. If so, then process 600 ends. Else, process 600 returns to block 630.

Figure 7E:
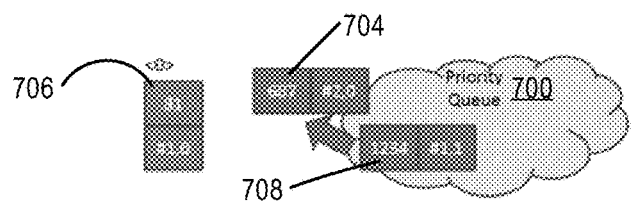
Figure 7F:
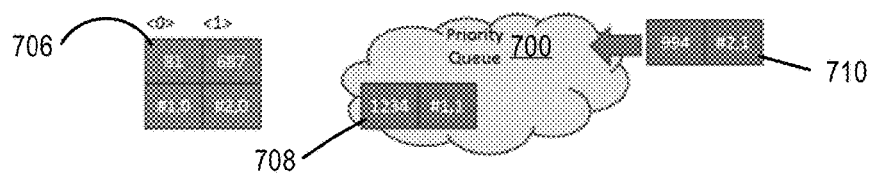
Figure 7G:
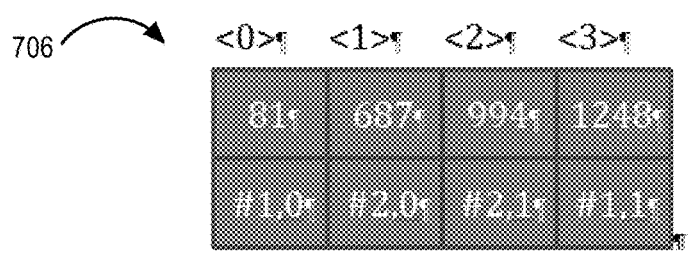

FIGS. 7E-7G depict example intermediate results after additional iterations of process 600. Specifically, FIG. 7E depicts an intermediate result where node entry 704 is selected (and removed) from priority queue 700 as the minimum node entry among the two node entries in priority queue 700 in FIG. 7D. FIG. 7F depicts an intermediate result where intermediate table 706 is updated to include the node information of node entry 704. Also, a node entry 710 from partition #2 is added to priority queue 700. FIG. 7G depicts intermediate table 706 after process 600 is complete, at least relative to the nodes identified in node ID lists 510-520.

Table A is an example mapping after four node entries have been added to the new list. Each row in Table A maps a node ID (or key) to a node index value.

TABLE A

| node ID (original) | node index (newly assigned) |
| --- | --- |
| 81 | 0 |
| 687 | 1 |
| 994 | 2 |
| 1248 | 3 |

How the mapping is used is described in more detail below with respect to the node property construction phase.

Graph Data Loading: Node Property Construction Phase

In the node property construction phase, node properties from each node ID list (or partition) are added to one or more new data structures that store the node properties in association with the new node list constructed in the node merging phase.

Figure 8:
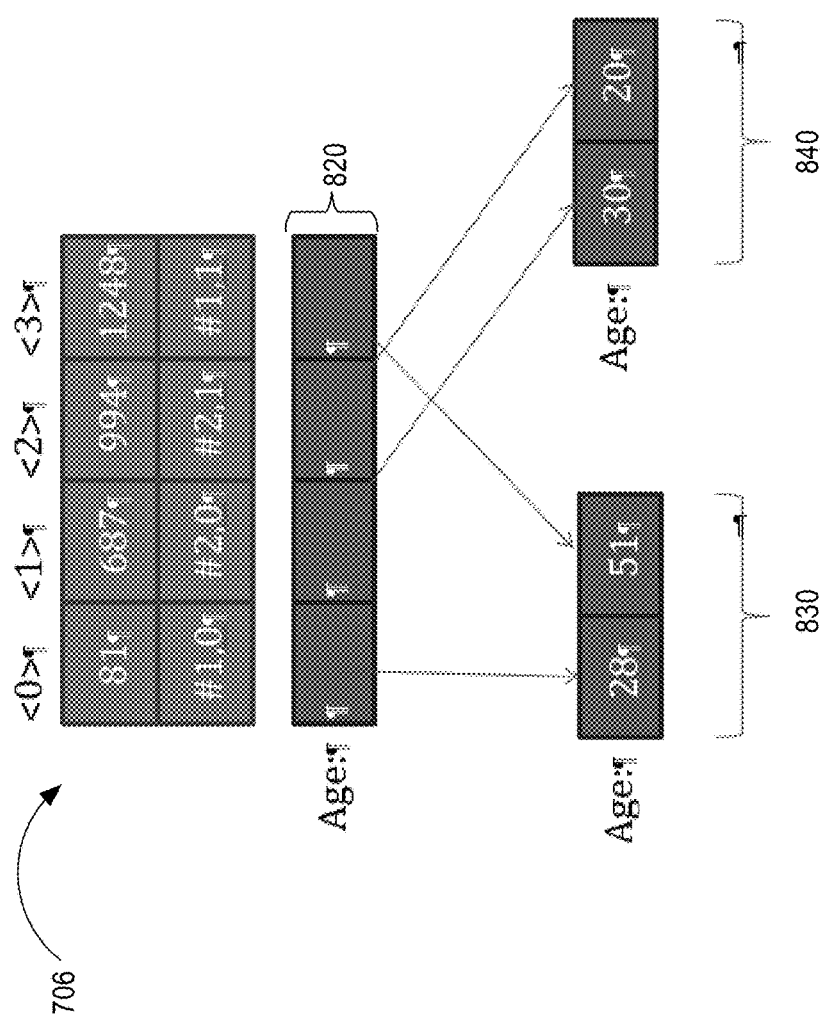
FIG. 8 is a block diagram that depicts an intermediate table during a node construction phase, in an embodiment.

FIG. 8 is a block diagram that depicts intermediate table 706, a node property array 820, and node property lists 830 and 840. Intermediate table 706 includes, for each node, a node ID, a partition ID, and a local index value. The nodes indicated in intermediate table 706 are in ascending node ID order. Node property array 820 includes information only about a single node property; in this example, "Age." Each position in node property array 820 corresponds to a position in intermediate table 706. For example, the first entry in node property array 820 indicates an age of a person represented by the first entry in intermediate table 706. Similarly, the second entry in node property array 820 indicates an age of a person represented by the second entry in intermediate table 706; and so forth.

The location information in intermediate table 706 (i.e., partition ID and local index value) and the location information in each node ID list is used to store the node properties such that each node in a graph is stored in association with the node properties.

In an embodiment, the node property construction phase is performed in parallel after the node merging phase is complete. A thread or process that is assigned to one set of node properties for a particular node will not conflict with another thread or process that is assigned to another set of node properties for another node.

For example, a thread analyzing the first entry in intermediate table 706 identifies a partition ID of '#1' and a local index value of '0.' The thread then identifies the list/partition in memory with partition ID of '#1' (i.e., node property list 830 in this example) and uses the local index value to identify a position within the list/partition. In this example, the node property value in partition ID '#1' at local index '0' is '28.' At the same time, a second thread analyzing the second entry in intermediate table 706 identifies a partition ID of '#2' and a local index value of '0.' The second thread then identifies the list/partition in memory with partition ID of '#2' (i.e., node property list 840 in this example) and uses the local index value to identify a position within the list/partition. In this example, the node property value in partition ID '#2' at local index '0' is '30.'

Each thread may be assigned a different set of entries from intermediate table 706. For example, if there are K threads and N entries in intermediate table 706, then each thread is assigned N/K node entries in intermediate table 706. One thread would be assigned node entries from position 0 to position N/K in intermediate table 706, another thread would be assigned node entries from position N/K+1 to position 2N/K in intermediate table 706, and so forth.

Graph Data Loading: Edge Loading Phase

In the edge loading phase, graph analytic engine 110 loads edge data of a graph from graph database 120 into memory. The edge loading phase may be similar to the node loading phase described previously. The edge data may be stored in P partitions in graph database. Graph analytic engine 110 may use K threads over K connections with graph database 120. If K=P, then each thread handles a single edge list/partition. If P>K, then a single thread may create multiple edge lists/partitions in memory. Because the edge loading phase may be handled by multiple threads executing concurrently, the edge loading phase may be performed in parallel.

Each edge list in memory is sorted using the same one or more criteria as each node list. For example, if each node list is sorted by node ID, then each edge list is sorted by node ID of the source node of each edge.

Figure 9:
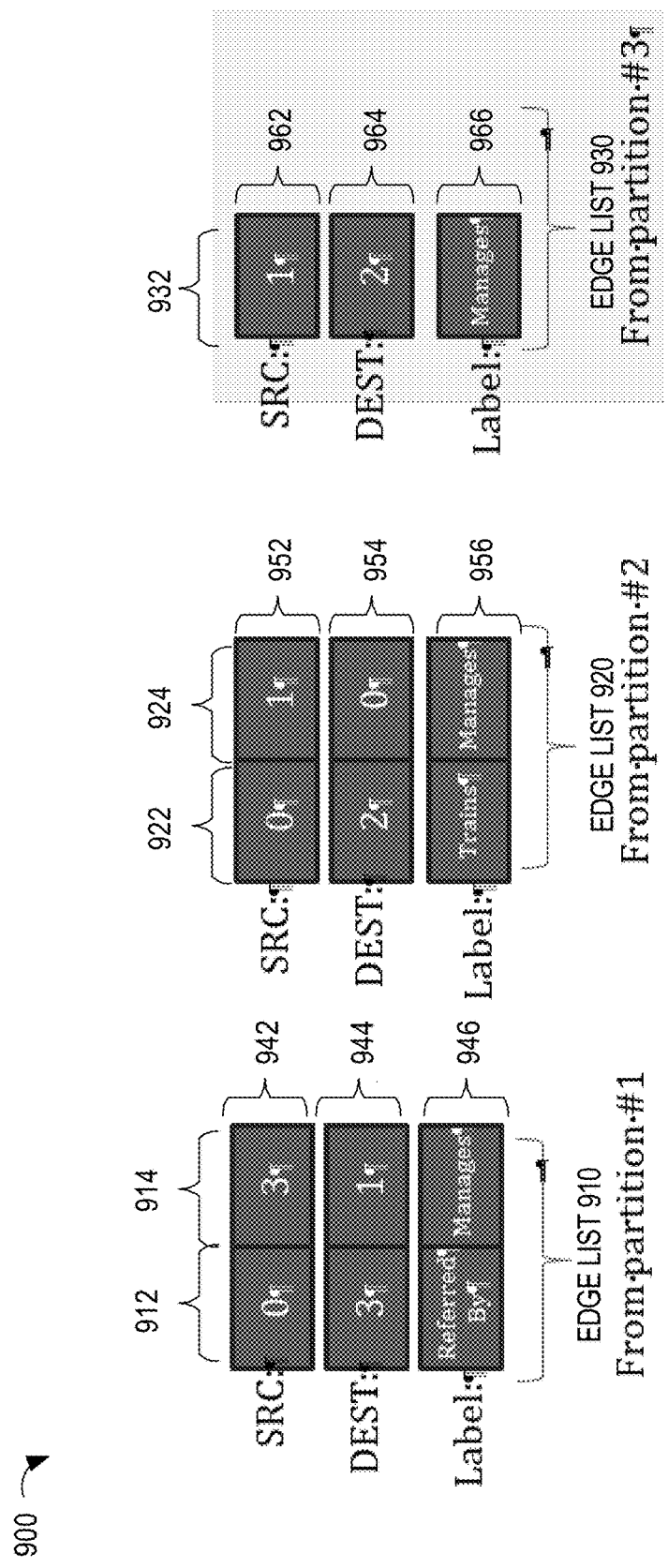
FIG. 9 is a block diagram that depicts an example result of an edge loading phase, in an embodiment.

FIG. 9 is a block diagram that depicts an example result 900 of an edge loading phase, in an embodiment. Result 900 includes edge lists 910-930. Edge list 910 includes edges 912 and 914, edge list 920 includes edges 922 and 924, and edge list 930 includes a single edge 932. Each edge list may originate from different partitions in graph database 120.

In the depicted example, each edge list 910-930 is stored as a separate set of column-oriented arrays 942-966. For example, for edge list 910, column-oriented array 942 stores source IDs, column-oriented array 944 stores destination IDs, and column-oriented array 946 stores edge properties (which, in this example, is named "Label"). Similarly, for edge list 920, column-oriented array 952 stores source IDs, column-oriented array 954 stores destination IDs, and column-oriented array 956 stores edge properties. Lastly, for edge list 930, column-oriented array 962 stores source IDs, column-oriented array 964 stores destination IDs, and column-oriented array 966 stores edge properties.

Edge information for a single edge is stored in a particular position of each column-oriented array. For example, the first position in each of column-oriented arrays 942-946 includes information about a first edge. Similarly, the second position in each of column-oriented arrays 942-946 includes information about a second edge that is different than the first edge.

In an embodiment, the edge loading phase involves using the mapping (e.g., in Table A) created in the node merging phase to replace source IDs and destination IDs of edges with their corresponding node index values. For example, using the mapping of Table A, the source ID of edge 912 was '81' but was replaced with '0' while the destination ID of edge 912 was '1248' but was replaced with '3'.

Graph Data Loading: Edge Merging Phase

In the edge merging phase, the edge loading results (e.g., depicted in FIG. 9) are merged into a new list or array, similar to neighbor array 220. The source ID of each edge indicated in each edge list is used to edge in a graph is assigned a new index or key value that indicates a position in the new list. For example, a node index of '0' indicates that the corresponding node is located at the first position in the new list. A node index of '10' indicates that the corresponding node is located at the 11$^{th}$ position in the new list. In an embodiment, the original node IDs (as they existed in graph database 120) are still preserved.

Figure 10A:
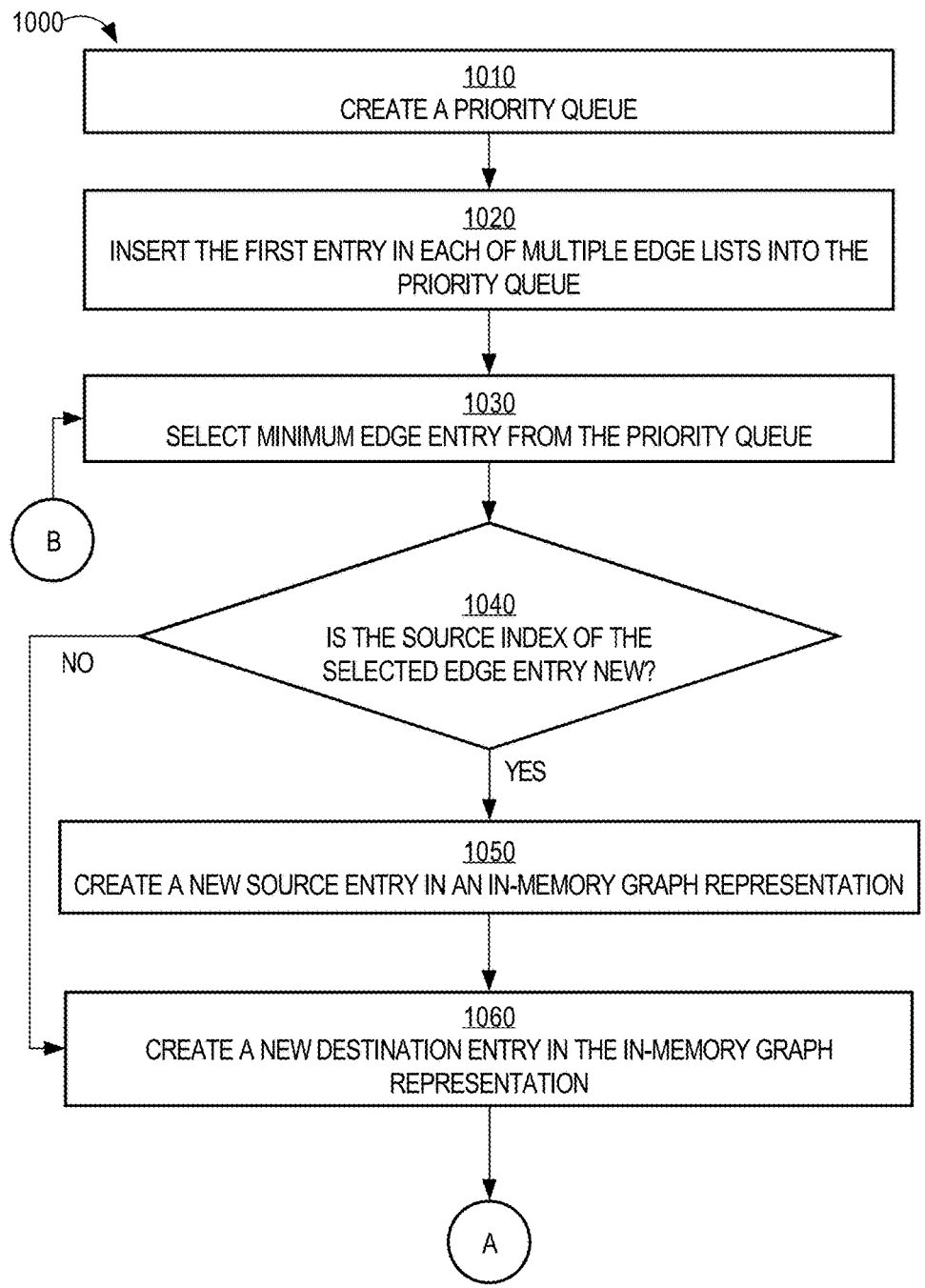
FIG. 10 (consisting of FIGS. 10A and 10B) is a flow diagram that depicts a process for merging multiple edge lists, in an embodiment.
Figure 10B:
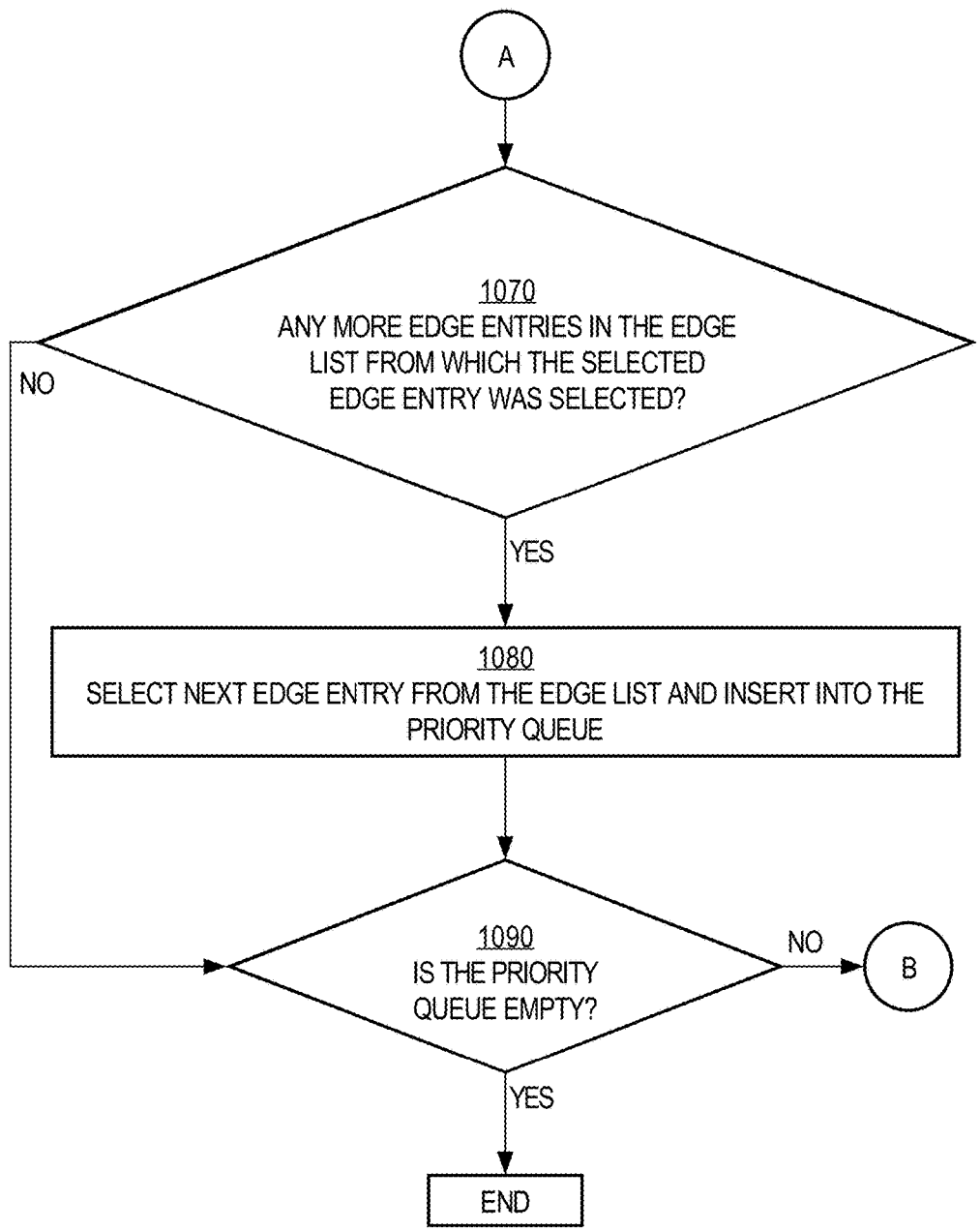

FIGS. 10A-10B are flow diagrams that depict a process 1000 for creating a new list of edge IDs from multiple of edge lists, in an embodiment. Process 1000 is described in context of FIGS. 11A-11G, which depict different example intermediate results of process 1000 relative to edge lists 910-930 depicted in FIG. 9.

At block 1010, a priority queue is created.

At block 1020, an edge entry for the first edge in each list of multiple edge lists is inserted into the priority queue. If there are three edge lists, then three edge entries are inserted into the priority queue.

A single edge entry may include one or more data items. For example, an edge entry may have the form of <source ID, destination ID, partition ID, and local index>, where "source ID" is an identifier (or key) that uniquely identifies a node relative to all other nodes in a graph, "destination ID" is an identifier (or key) that uniquely identifies a node relative to all other nodes in the graph and is connected to the node (identified by the corresponding source ID) in the graph, "partition ID" is an identifier that uniquely identifies an edge list and/or a partition from which edge information of the corresponding edge was read, and "local index" is a position of the corresponding edge in the list/partition.

Figure 11A:
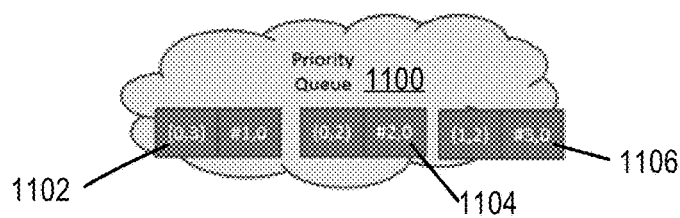
FIGS. 11A-11H depict different example intermediate results of an edge merging phase.

FIG. 11A depicts an intermediate result where priority queue 1100 includes three edge entries: edge entry 1102, edge entry 1104, and edge entry 1106. Edge entry 1102 has a source index of '0,' a destination index of '3,' a partition ID of '#1' and a local index of '0'. Edge entry 1104 has a source index of '0,' a destination index of '2,' a partition ID of '#2' and a local index of '0'. Edge entry 1106 has a source index of '1,' a destination index of '2,' a partition ID of '#3,' and a local index of '0.'

At block 1030, a minimum edge entry in the priority queue is selected. A minimum edge entry is one that has the lowest source index among the edge entries in the priority queue. If there are multiple edge entries with the lowest source index, then, from those edge entries, the edge entry with the lowest destination index is selected. Alternatively, a maximum edge entry in the priority queue is selected. This presumes that the edge lists (e.g., from the various partitions) are ordered by source index in descending order. However, in each of the examples provided herein, the edge lists are ordered by source index and then by destination index in ascending order.

Figure 11B:
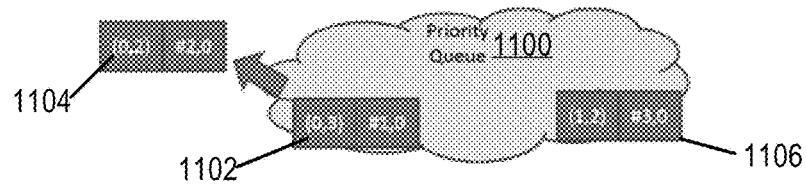

FIG. 11B depicts an intermediate result where edge entry 1104 is selected as the minimum node entry. Both edge entry 1102 and 1104 have the same source index, but edge entry has a lower destination index.

At block 1040, it is determined whether the source index of the selected edge entry is a "new" source index. A "new" source index is a source index that has not yet been seen before during process 1000 relative to a single graph. Thus, the first iteration of block 1040 will always be true. If the determination is block 1040 is true, then process 1000 proceeds to block 1050. Else, process 1000 proceeds to block 1060.

At block 1050, a new source entry is created in an in-memory graph representation that is initially empty. Thus, the first iteration of block 1050 (or a previous block) involves creating an in-memory graph representation based on the edge entry selected in block 1030. For subsequent iterations of block 1050 for the same graph, block 1050 involves updating the in-memory graph representation with the edge entry selected in block 1030.

The new source entry created in block 1050 may be a new entry in a list, an array (e.g., node array 210), or a table. The new source entry represents the source node of the selected edge entry.

At block 1060, a new destination entry is created in the in-memory graph representation. The new destination entry created may be a new entry in a list, an array (e.g., neighbor array 220), or a table. The new destination entry represents the destination node of the selected edge entry.

If the current iteration of block 1060 immediately follows an iteration of block 1050 (meaning that the selected edge entry includes a source index that has not yet been seen during performance of process 1000 for the present graph), then the new source entry is caused to point to the new destination entry. This step is applicable where the in-memory graph representation is modeled using a compressed sparse row (CSR) representation.

Figure 11C:
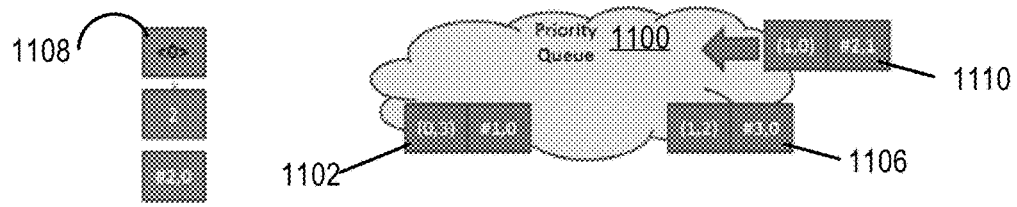

FIG. 11C depicts an intermediate result where edge entry 1104 is the first entry in partial in-memory representation 1108 that includes, initially, the four data items from edge entry 1104; namely, a source index, a destination index, a partition ID, and a local index. In-memory representation 1108 is "partial" in the sense that there are more edge entries to add to in-memory representation 1108. When process 1000 completes, then in-memory representation 1108 may be considered "final," although in-memory representation 1108 may be later supplemented with node and/or edge property data.

Embodiments are not limited to how in-memory representation 1108 is implemented. In the depicted example, in-memory representation 1108 is similar to node array 210 and neighbor array 220. In-memory representation 1108 may be implemented as one or more lists, one or more arrays, and/or one or more tables. A table and an array may be considered different types of lists.

At block 1070, it is determined whether there are any more edge entries in the list/partition from which the selected edge entry was selected. If so, then process 1000 proceeds to block 1080. Else, process 1000 proceeds to block 1090. Block 1070 may be performed by maintaining a local index value for each list (or partition) from which edge entries are selected for the priority queue. If the edge entry that is selected in block 1030 originates from a particular list, then a local index value associated with the particular list is incremented. If the incremented local index value is greater than the size of the particular list, then the particular list is empty.

At block 1080, the next edge entry from the same edge list as the selected edge entry is inserted into the priority queue (and removed from that edge list). Block 1080 may also involve incrementing a local index value for the edge list indicating that another edge entry from that edge list has been inserted into the priority queue.

Figure 11D:
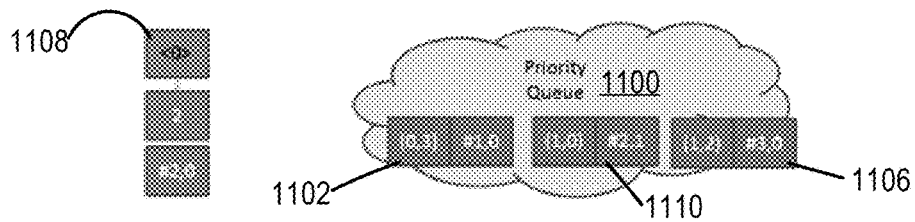

FIGS. 11C and 11D depict intermediate results where edge entry 1110 is selected from partition '#2' and inserted into priority queue 1100.

At block 1090, it is determined whether the priority queue is empty. If so, then process 1000 ends. Else, process 1000 returns to block 1030.

Figure 11E:
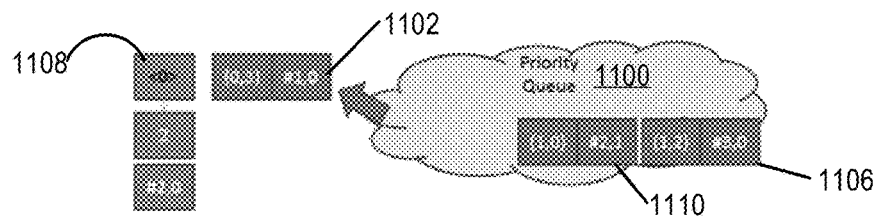
Figure 11F:
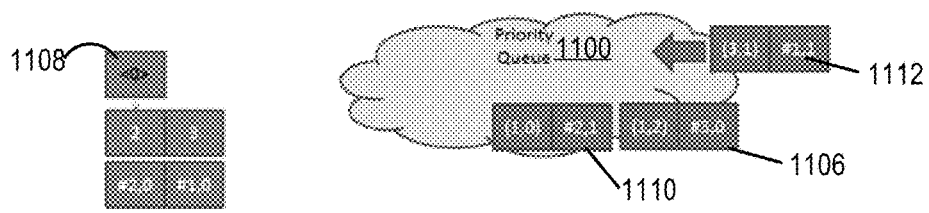
Figure 11G:
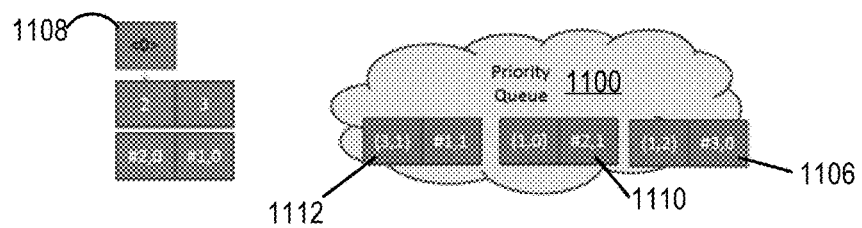
Figure 11H:
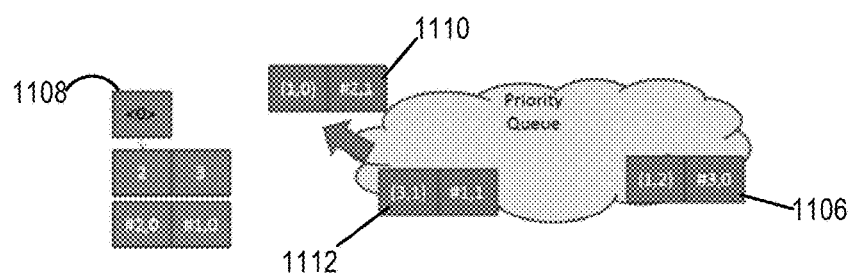

FIGS. 11E-11H depict example intermediate results after additional iterations of process 1000. Specifically, FIG. 11E depicts an intermediate result where edge entry 1102 is selected (and removed) from priority query 1100 as the minimum edge entry among the three edge entries in priority queue 1100 in FIG. 11D. FIGS. 11F-11G depict intermediate results where in-memory representation 1108 is updated to include the edge information of edge entry 1102. Also, an edge entry 1112 from partition #1 is added to priority queue 1100. FIG. 11H depicts an intermediate result where edge entry 1110 is selected (and removed) from priority query 1100 as the minimum edge entry among the three edge entries in priority queue 1100 in FIG. 11G.

Figure 12:
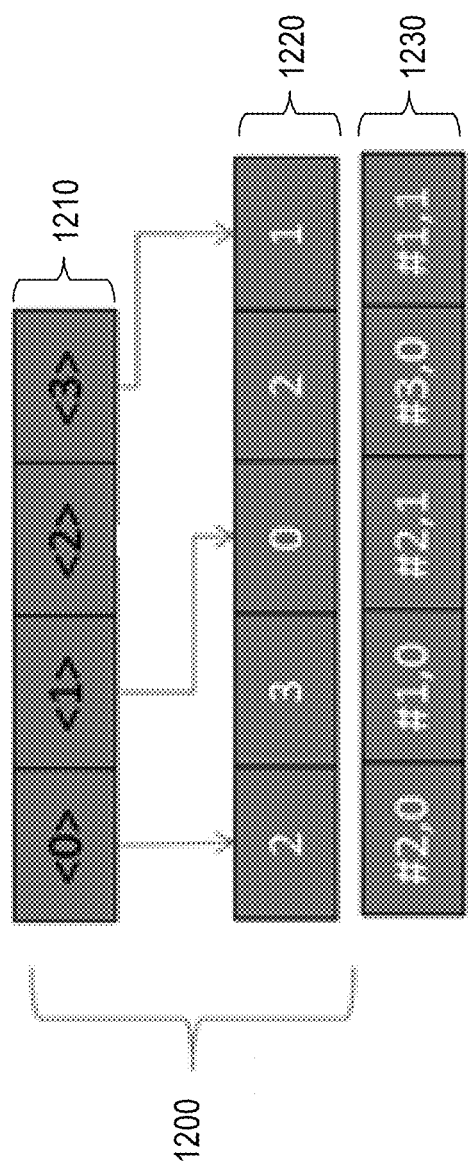
FIG. 12 is a block diagram that depicts an example result after an edge merging phase, in an embodiment.

FIG. 12 depicts an example result after process 1000 completes relative to the graph data of data model 400. In-memory graph representation 1200 includes a node array 1210 and a neighbor array 1220. Node '0' has neighbors '2' and '3,' node '1' has neighbors '0' and '2,' node '2' has no neighbors that are not previously indicated, and node '3' has neighbor '1'. If the corresponding graph is a directed graph and there is an edge from node '2' to another node, then node array 1210 would include an entry that points to an entry in neighbor array 1220.

Temporary table 1230 stores, for each entry, a partition ID and local index value. Temporary table 1230 is used during the edge property construction phase. Although referred to as a "table," temporary table 1230 may be implemented as another data structure, such as a list, an array, or a vector.

In an embodiment, the edge merging phase may be performed during the node merging phase. For example, after a certain number of mappings in the node ID-to-node index mapping have been created (e.g., one thousand), then the edge merging phase begins. One goal for performing the edge merging phase is for that process to not have to wait for the node ID-to-node index mapping to be updated with relevant node IDs. If a mapping for a particular destination ID does not yet exist, for example, then the edge merging process may stall.

Therefore, in other embodiments, the edge loading phase is performed in parallel with the node merging phase since loading edges does not require any information generated during the node merging phase.

Graph Data Loading: Edge Property Construction Phase

The edge property construction phase is similar to the node construction phase described previously. For example, multiple threads executing concurrently access partition identification data and local index data associated with different edges indicated in the in-memory graph representation generated using process 1000 to quickly identify (1) the appropriate edge lists (e.g., edge lists 910-930) loaded from graph database 120 and (2) locations within the edge lists that store edge property data for the corresponding edges.

For example, the first entry in temporary table 1230 identifies partition ID '#2' and local index value '1.' A thread identifies the edge list corresponding to partition ID '#2' and reads one or more edge properties stored at local index value '1' (i.e., without having to read any other entries in the edge list). Partition ID '#2' corresponds to edge list 920 in FIG. 9. The edge property at local index value '0' in column-oriented array 956 is "Trains." That edge property is stored in in-memory graph representation 1200 or another data structure, such as an column-oriented array, that is stored in association with in-memory graph representation 1200.

Figure 13:
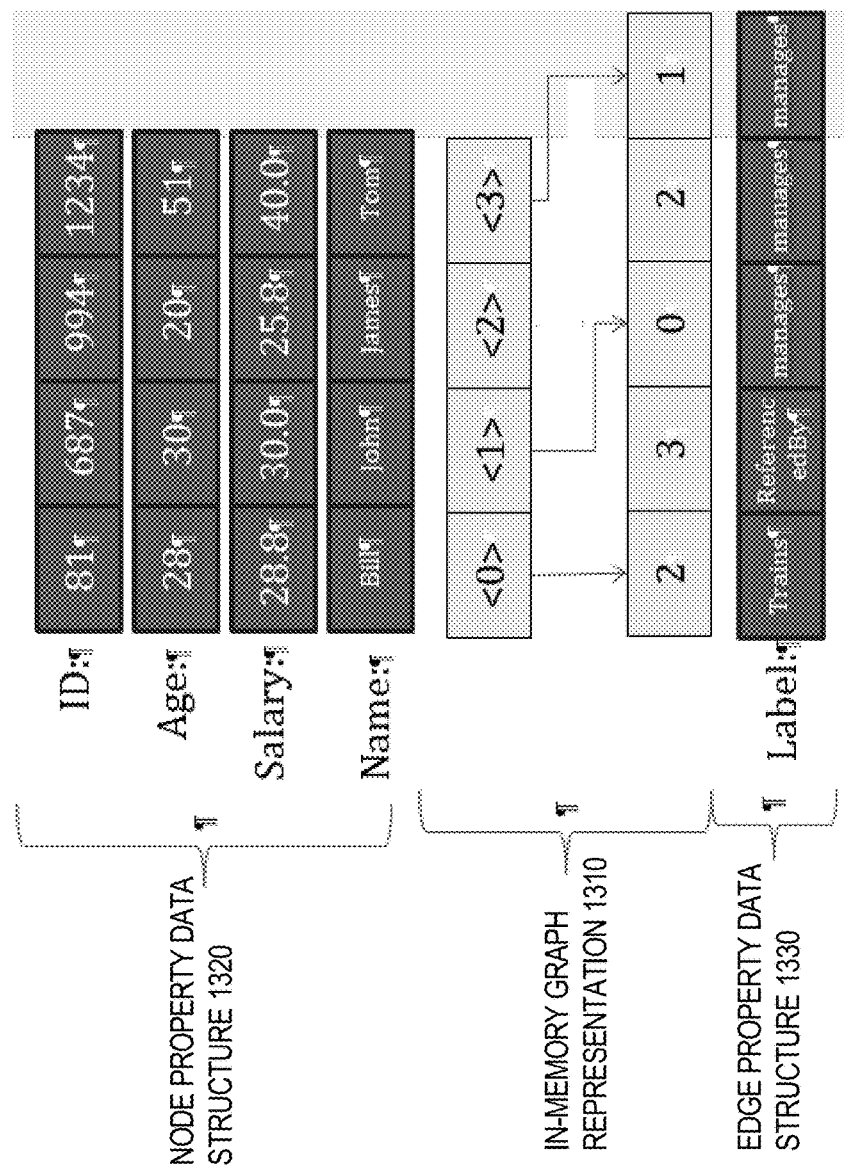
FIG. 13 is a block diagram that depicts an example in-memory graph representation and its associated node and edge properties, in an embodiment.

FIG. 13 is a block diagram that depicts an example in-memory graph representation 1310 and its associated node and edge properties, in an embodiment. The node properties are stored in node property data structure 1320, which may be implemented using a different column-oriented array for each node property type. Similarly, the edge properties are stored in edge property data structure 1330, which may be implemented using a different column-oriented array for each edge property type. In the depicted example, because there are four node property types, there are four column-oriented arrays for node property data structure 1320. Similarly, because there is one edge property type, there is one column-oriented array for edge property data structure 1330.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
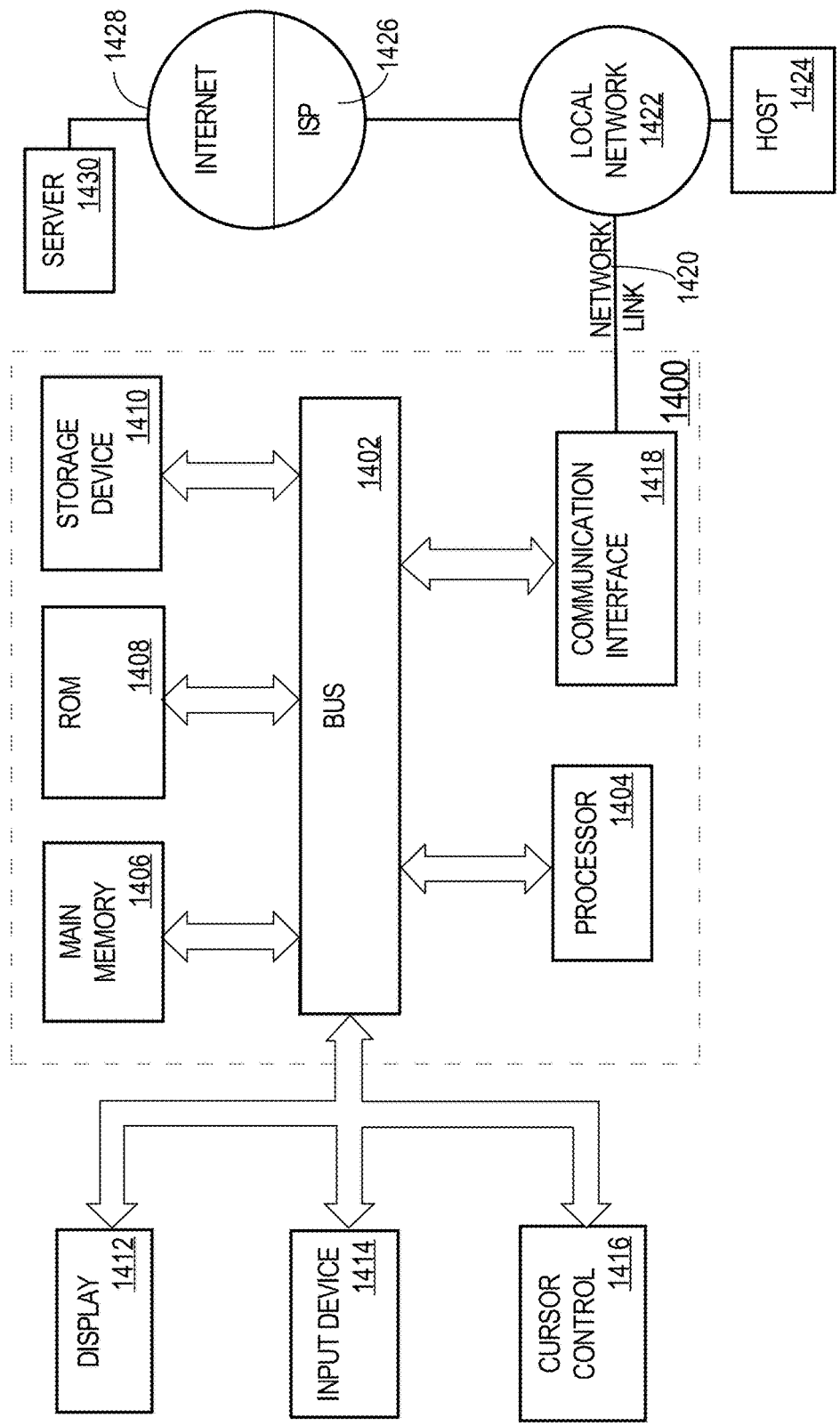
FIG. 14 is a block diagram that illustrates a computer system upon which an embodiment of the invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating an in-memory representation of a graph that is represented in graph data that is in a graph data format and that is stored in persistent storage, the method comprising:
   identifying, in memory, a plurality of node identifier lists of nodes indicated in the graph data, wherein each node identifier list in the plurality of node identifier lists is ordered based on one or more order criteria and identifies multiple nodes;
   for each of multiple node identifiers in the plurality of node identifier lists:
      based on the one or more order criteria, determining a particular node identifier, from among the plurality of node identifier lists, to remove;
      removing the particular node identifier from one of the plurality of node identifier lists;
      determining a particular node index value for the particular node identifier;
      based on determining the particular node index value, updating a mapping to include an association between the particular node index value and the particular node identifier;

wherein the mapping maps, for each node identifier indicated in the plurality of node identifier lists, said each node identifier to a node index value;
wherein the method is performed by one or more computing devices.

2. The method of claim 1, further comprising, prior to determining the particular node identifier:
for each node partition of a plurality of node partitions that are stored in the persistent storage:
storing an index for said each node partition;
using the index for said each node partition to generate a different node identifier list of the plurality of node identifier lists;
sending the different node identifier list to a graph analytic engine that creates the mapping.

3. The method of claim 2, further comprising:
for each edge partition of a plurality of edge partitions that are stored in the persistent storage:
storing a second index for said each edge partition;
using the second index for said each edge partition to generate a different ordered edge list of a plurality of ordered edge lists;
sending the different ordered edge list to the graph analytic engine.

4. The method of claim 3, wherein:
each edge partition of the plurality of edge partitions stores, for each edge indicated in said each edge partition, a source identifier that identifies a first node and a destination identifier that identifies a second node;
each ordered edge list in the plurality of ordered edge lists is ordered, first, based on source identifier and, second, based on destination identifier.

5. The method of claim 1, further comprising:
creating a first intermediate list that comprises a plurality of entries;
wherein each entry in the first intermediate list includes: (1) node identifier data that identifies a node; (2) partition data that indicates a node identifier list from which the node identifier originates; and (3) index data that indicates a position within the node identifier list.

6. The method of claim 5, further comprising:
storing, in the persistent storage, in association with each node identifier indicated in each node identifier list of the plurality of node identifier lists, one or more properties of a node identified by said each node identifier;
using the first intermediate list to determine where to store, in memory, the one or more properties of each node identified in each node identifier list.

7. The method of claim 6, wherein using the first intermediate list comprises:
assigning a different set of node properties to a different thread of a plurality of threads that execute concurrently;
wherein each thread of the plurality of threads uses, concurrently with respect to each other thread of the plurality of threads, the first intermediate list to determine where to store the set of node properties that are assigned to said each thread.

8. The method of claim 1, further comprising:
identifying a plurality of edge lists of edges indicated in the graph data, wherein each edge list in the plurality of edge lists is ordered based on the one or more order criteria and indicates multiple edges;
using the mapping to replace a node identifier of each edge indicated in the plurality of edge lists with a corresponding node index value.

9. The method of claim 8, further comprising:
creating a neighbor list of node identifiers that is initially empty;
for each of multiple edges indicated in the plurality of edge lists:
based on the one or more order criteria, selecting a particular edge from among the plurality of edge lists;
removing the particular edge from one of the plurality of edge lists;
adding the particular edge to the neighbor list of node identifiers.

10. The method of claim 9, wherein adding the particular edge to the neighbor list comprises:
creating a new edge entry in the neighbor list, wherein the new edge entry includes a first node index value that is associated with a destination node of the particular edge;
determining whether a source node index value associated with the particular edge is new relative to all other source node index values currently indicated in a node list of the in-memory representation;
if the source node index value is new, then creating, in the node list, a new node entry that corresponds to a node in the graph and causing the new node entry to point to the new edge entry.

11. The method of claim 9, further comprising:
creating an intermediate list that is associated with the neighbor list of node identifiers;
wherein each position in the intermediate list corresponds to a position in the neighbor list and includes (a) edge list data that indicates an edge list from which an edge, corresponding to the position in the neighbor list, originates and (b) index data that indicates a position within the edge list where one or more edge properties of the edge are located.

12. The method of claim 11, further comprising:
storing, in the persistent storage, in association with each edge indicated in each edge list of the plurality of edge lists, one or more properties of said each edge;
assigning a different set of edge properties to a different thread of a plurality of threads that execute concurrently;
wherein each thread of the plurality of threads uses the intermediate list to determine where to store the set of edge properties that are assigned to said each thread.

13. A method for generating an in-memory representation of a graph, the method comprising:
loading, into memory from persistent storage, node data that identifies a plurality of nodes of the graph and is ordered based on one or more criteria;
for each node identifier indicated in the node data:
determining a node index value in a node array of the in-memory representation;
storing, in a mapping, an association between the node index value and said each node identifier;
loading, into the memory from the persistent storage, edge data that identifies a plurality of edges of the graph and is ordered based on the one or more criteria;
for each edge indicated in the edge data:
using the mapping to identify (1) a source node identifier of said each edge with a first node index value and (2) a destination node identifier of said each edge with a second node index value;
identifying an entry in the node array based on the first node index value;

identifying an entry in a neighbor array of the in-memory representation based on the second node index value;

storing information about said each edge in the entry in the neighbor array;

wherein the method is performed by one or more computing devices.

14. One or more storage media storing instructions for generating an in-memory representation of a graph that is represented in graph data that is in a graph data format and that is stored in persistent storage, wherein the instructions, when executed by one or more processors, cause:

identifying, in memory, a plurality of node identifier lists of nodes indicated in the graph data, wherein each node identifier list in the plurality of node identifier lists is ordered based on one or more order criteria and identifies multiple nodes;

for each of multiple node identifiers in the plurality of node identifier lists:
based on the one or more order criteria, determining a particular node identifier, from among the plurality of node identifier lists, to remove;
removing the particular node identifier from one of the plurality of node identifier lists;
determining a particular node index value for the particular node identifier;
based on determining the particular node index value, updating a mapping to include an association between the particular node index value and the particular node identifier;

wherein the mapping maps, for each node identifier indicated in the plurality of node identifier lists, said each node identifier to a node index value.

15. The one or more storage media of claim 14, wherein the instructions, when executed by the one or more processors, further cause, prior to determining the particular node identifier:

for each node partition of a plurality of node partitions that are stored in the persistent storage:
storing an index for said each node partition;
using the index for said each node partition to generate a different node identifier list of the plurality of node identifier lists;
sending the different node identifier list to a graph analytic engine that creates the mapping.

16. The one or more storage media of claim 15, wherein the instructions, when executed by the one or more processors, further cause:

for each edge partition of a plurality of edge partitions that are stored in the persistent storage:
storing a second index for said each edge partition;
using the second index for said each edge partition to generate a different ordered edge list of a plurality of ordered edge lists;
sending the different ordered edge list to the graph analytic engine.

17. The one or more storage media of claim 16, wherein:
each edge partition of the plurality of edge partitions stores, for each edge indicated in said each edge partition, a source identifier that identifies a first node and a destination identifier that identifies a second node;
each ordered edge list in the plurality of ordered edge lists is ordered, first, based on source identifier and, second, based on destination identifier.

18. The one or more storage media of claim 14, wherein the instructions, when executed by the one or more processors, further cause:

creating a first intermediate list that comprises a plurality of entries;
wherein each entry in the first intermediate list includes: (1) node identifier data that identifies a node; (2) partition data that indicates a node identifier list from which the node identifier originates; and (3) index data that indicates a position within the node identifier list.

19. The one or more storage media of claim 18, wherein the instructions, when executed by the one or more processors, further cause:

storing, in the persistent storage, in association with each node identifier indicated in each node identifier list of the plurality of node identifier lists, one or more properties of a node identified by said each node identifier;
using the first intermediate list to determine where to store, in memory, the one or more properties of each node identified in each node identifier list.

20. The one or more storage media of claim 19, wherein using the first intermediate list comprises:

assigning a different set of node properties to a different thread of a plurality of threads that execute concurrently;
wherein each thread of the plurality of threads uses, concurrently with respect to each other thread of the plurality of threads, the first intermediate list to determine where to store the set of node properties that are assigned to said each thread.

21. The one or more storage media of claim 14, wherein the instructions, when executed by the one or more processors, further cause:

identifying a plurality of edge lists of edges indicated in the graph data, wherein each edge list in the plurality of edge lists is ordered based on the one or more order criteria and indicates multiple edges;
using the mapping to replace a node identifier of each edge indicated in the plurality of edge lists with a corresponding node index value.

22. The one or more storage media of claim 21, wherein the instructions, when executed by the one or more processors, further cause:

creating a neighbor list of node identifiers that is initially empty;
for each of multiple edges indicated in the plurality of edge lists:
based on the one or more order criteria, selecting a particular edge from among the plurality of edge lists;
removing the particular edge from one of the plurality of edge lists;
adding the particular edge to the neighbor list of node identifiers.

23. The one or more storage media of claim 22, wherein adding the particular edge to the neighbor list comprises:

creating a new edge entry in the neighbor list, wherein the new edge entry includes a first node index value that is associated with a destination node of the particular edge;
determining whether a source node index value associated with the particular edge is new relative to all other source node index values currently indicated in a node list of the in-memory representation;

if the source node index value is new, then creating, in the node list, a new node entry that corresponds to a node in the graph and causing the new node entry to point to the new edge entry.

24. The one or more storage media of claim 22, wherein the instructions, when executed by the one or more processors, further cause:

creating an intermediate list that is associated with the neighbor list of node identifiers;

wherein each position in the intermediate list corresponds to a position in the neighbor list and includes (a) edge list data that indicates an edge list from which an edge, corresponding to the position in the neighbor list, originates and (b) index data that indicates a position within the edge list where one or more edge properties of the edge are located.

25. The one or more storage media of claim 24, wherein the instructions, when executed by the one or more processors, further cause:

storing, in the persistent storage, in association with each edge indicated in each edge list of the plurality of edge lists, one or more properties of said each edge;

assigning a different set of edge properties to a different thread of a plurality of threads that execute concurrently;

wherein each thread of the plurality of threads uses the intermediate list to determine where to store the set of edge properties that are assigned to said each thread.

\* \* \* \* \*